UNITED STATES PATENT OFFICE.

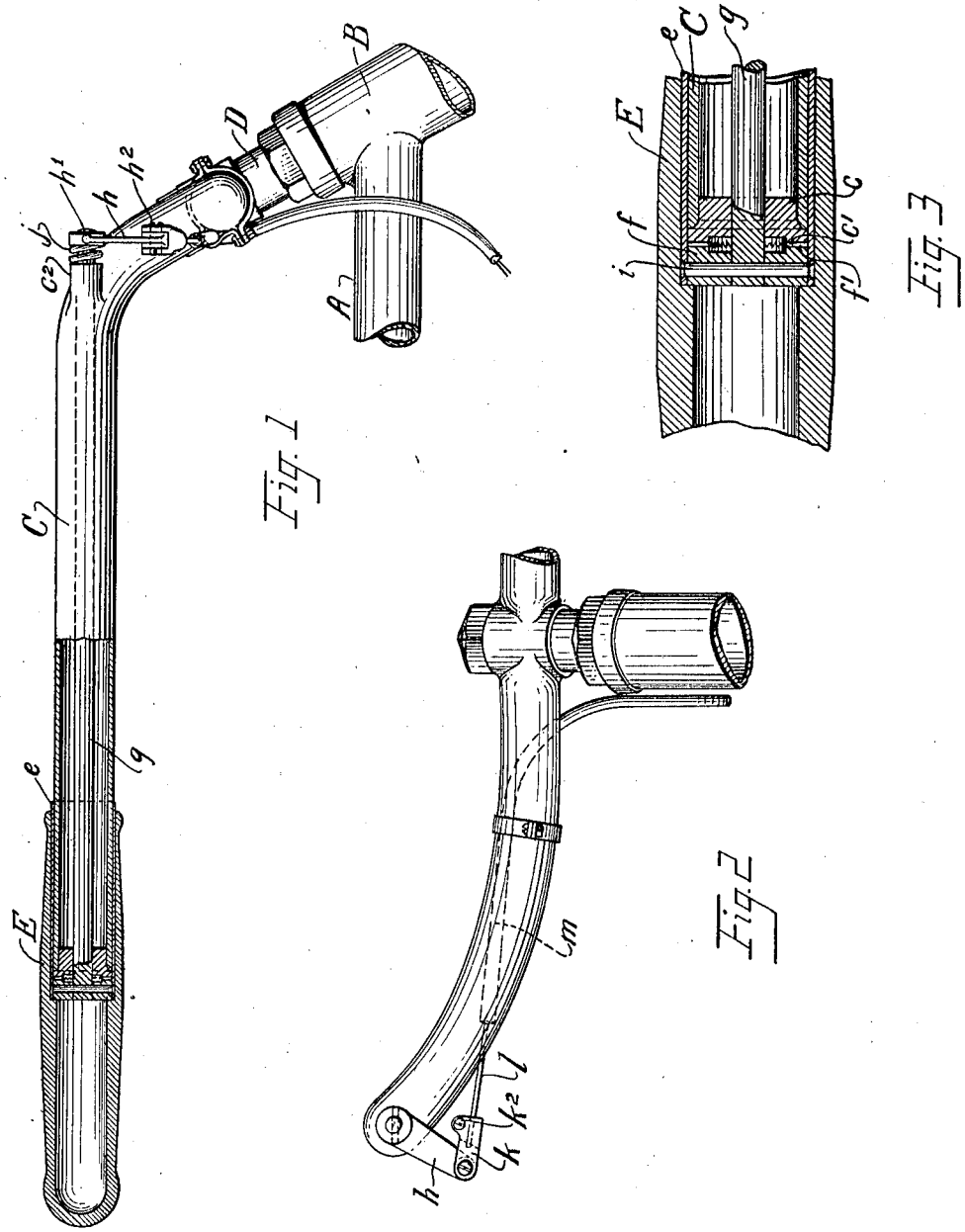

WILLIAM G. HENDERSON, OF CLEVELAND, OHIO.

GRIP-CONTROL MECHANISM FOR MOTOR-CYCLES.

1,022,081.　　　　　Specification of Letters Patent.　　Patented Apr. 2, 1912.

Application filed September 15, 1911. Serial No. 649,587.

*To all whom it may concern:*

Be it known that I, WILLIAM G. HENDERSON, a citizen of the United States, residing in Cleveland, county of Cuyahoga, and State of Ohio, have invented certain new and useful Improvements in Grip-Control Mechanism for Motor-Cycles; and I do hereby declare the following to be a full, clear, and exact description of the same, such as will enable others skilled in the art to which it appertains to make and use the same.

The object of my invention is to simplify the spark and throttle control on motor vehicles and to provide means for holding the sparking apparatus or the throttle in the position to which it is set by the operator and thereby overcome movement of the spark mechanism and of the throttle caused directly or indirectly by the vibration and jolting of the machine. To accomplish this purpose I provide the usual form of rubber grip at the ends of the handle bars and convey the motion through mechanism mounted on the handle bars. From the handle bars downward I employ incased wire leading to the throttle and sparking mechanism.

In the accompanying drawing Figure 1 is a side elevation of a part of the frame of a motorcycle and of the handle bar. Fig. 2 is a front view of the same. Fig. 3 shows an enlarged sectional view of the details of the interlocking mechanism hereinafter described.

A is the frame of the machine and B the steering head of the frame in which the fork D is mounted.

C is the handle bar and E the hand grip. Inserted and rigidly fastened in the forward end of the grip E is a sleeve $e$, which is a slip fit over the rear end of the handle bar C. In the rear end of the sleeve $e$ is a collar $f$. The front surface $f^1$ of this collar is radially toothed and the collar is rigidly mounted on the shaft $g$ by the pin $i$. The pin $i$ passes through the sleeve $e$ collar $f$ and shaft $g$. Rigidly mounted in the rear of the handle bar C is a collar $c$, the rear surface of which has radial teeth $c^1$ adapted to engage the toothed surface $f^1$ of the collar $f$. The shaft $g$ passes through the collar $c$, the fore and aft portion of the handle bar C, and is mounted near its forward end in the lug $c^2$ on the handle bar $c$. On the forward end of the shaft $g$ I mount a crank $h$ by means of a pin $h^1$. On the shaft $g$ between the forward end of the lug $c^2$ and the crank $h$, is a spiral spring $j$, adapted, by pressing forwardly against the crank $h$, to hold the toothed surfaces of the collars $f$ and $c$ in adjustable contact and prevent rotary motion of the shaft $g$ and crank $h$, except when the operator turns the grip E. Mounted on the outer end of the crank $h$, by means of the screw $h^2$, is the adjustable clamp $k$ adapted to receive and, by means of the screw $k^2$, bind or firmly grip the wire 1. The wire 1 is incased in a spiral spring casing $m$, the said casing being mounted on the frame of the machine as will be readily understood by those familiar with the art.

It is obvious that any form of toothed surface in, or on, the grip with a corresponding toothed surface on the handle bar, with means for holding said toothed surfaces in contact will be within my invention, but I prefer the form hereinbefore described as most perfectly embodying my invention and as being the simplest and most efficient manner of reducing it to practice.

The throttle or sparking mechanism is controlled by the operator by turning the grip in the direction desired according to the manner in which it is connected with the throttle or sparking device and the tension of the spring will cause the toothed surfaces to hold the mechanism in the position to which it has been adjusted by the operator.

Having described my invention I claim:

1. In spark and throttle controlling mechanism for motor vehicles, the combination with the handle bar of a rotatable grip mounted on the handle bar, said grip being provided with an internal toothed surface, a toothed surface on the handle bar corresponding to the toothed surface of the grip, a longitudinal shaft rigidly fastened to said grip and extending through the straight portion of the handle bar and mounted at the turn of the bar, means for pressing said shaft forward and holding said toothed surfaces in adjustable contact and means for conveying the motion imparted to the grip by the operator to the throttle or sparking device, for the purpose specified.

2. In a spark and throttle controlling mechanism for motor vehicles the combination with the handle bar of a rotatable grip mounted on the handle bar, said grip being provided with an internal radially toothed surface, a radially toothed surface on the handle bar corresponding to the toothed surface of the grip, a longitudinal shaft rigidly secured to said grip and extending through the straight portion of the handle bar, a bearing at the turn of the handle bar adapted to support the longitudinal shaft, a crank or arm at the forward end of said longitudinal shaft and means for conveying the motion imparted by the operator to the grip, from said crank to the throttle or sparking device, and a spring mounted on the forward end of said longitudinal shaft between the hub on the handle bar and said crank adapted to force said shaft forward and hold the said toothed surfaces in adjustable contact, substantially as and for the purpose specified.

In witness whereof I hereunto set my hand this 12th day of September, 1911.

WILLIAM G. HENDERSON.

In the presence of—
EDWARD N. CONRAD,
EDITH PETERS.

Copies of this patent may be obtained for five cents each, by addressing the "Commissioner of Patents, Washington, D. C."